(12) United States Patent
Nishio et al.

(10) Patent No.: US 7,827,616 B2
(45) Date of Patent: Nov. 2, 2010

(54) DECODING APPARATUS

(75) Inventors: Kosuke Nishio, Osaka (JP); Takashi Katayama, Osaka (JP); Tomoki Ogawa, Osaka (JP)

(73) Assignee: Panasonic Corporation, Osaka (JP)

( * ) Notice: Subject to any disclaimer, the term of this patent is extended or adjusted under 35 U.S.C. 154(b) by 1124 days.

(21) Appl. No.: 11/494,745

(22) Filed: Jul. 28, 2006

(65) Prior Publication Data
US 2007/0028306 A1 Feb. 1, 2007

(30) Foreign Application Priority Data
Jul. 29, 2005 (JP) ............................ 2005-221806

(51) Int. Cl.
*G06F 21/00* (2006.01)
(52) U.S. Cl. .......................................... 726/30; 705/57
(58) Field of Classification Search ................... 705/57; 726/26–32
See application file for complete search history.

(56) References Cited

U.S. PATENT DOCUMENTS

| | | | | |
|---|---|---|---|---|
| 6,480,607 B1* | 11/2002 | Kori et al. | .................... | 380/201 |
| 6,587,821 B1* | 7/2003 | Rhoads | ........................ | 704/270 |
| 7,599,605 B2* | 10/2009 | Kawamura et al. | ............ | 386/95 |
| 2001/0037307 A1* | 11/2001 | Kori et al. | ..................... | 705/57 |
| 2003/0156735 A1* | 8/2003 | Maes et al. | ................. | 382/100 |
| 2004/0015362 A1* | 1/2004 | Rhoads | ........................ | 704/273 |
| 2004/0049392 A1* | 3/2004 | Yamada | ....................... | 704/273 |
| 2004/0111628 A1* | 6/2004 | Inotani et al. | ................ | 713/189 |
| 2006/0044976 A1* | 3/2006 | Ishiguchi | .................... | 369/53.2 |
| 2006/0080109 A1* | 4/2006 | Kakuno et al. | ............... | 704/500 |
| 2007/0028308 A1* | 2/2007 | Nishio et al. | ................... | 726/27 |
| 2007/0033145 A1* | 2/2007 | Nishio et al. | ................... | 705/57 |
| 2007/0136729 A1* | 6/2007 | Neuman | ...................... | 718/102 |

FOREIGN PATENT DOCUMENTS

| | | |
|---|---|---|
| JP | 2002-359835 | 12/2002 |
| JP | 2005-116152 | 4/2005 |

OTHER PUBLICATIONS

Chinese Office Action issued in Chinese Patent Application No. CN 200610108914.5 dated Jul. 12, 2010.

\* cited by examiner

*Primary Examiner*—Christian LaForgia
(74) *Attorney, Agent, or Firm*—McDermott Will & Emery LLP

(57) ABSTRACT

A decoding apparatus includes: a decoding section for decoding a first one of input encoded audio data sets that has been encoded by a certain encoding method; a first output section for outputting audio data decoded by the decoding section, in accordance with a first output control signal; a second output section for externally outputting the first one of the input encoded audio data sets, or a second one of the input encoded audio data sets, in accordance with a second output control signal; a copyright information detection section for detecting copyright information from the audio data decoded by the decoding section; a communications section for communicating with an external device which receives the encoded audio data set output from the second output section; and an output control section for outputting the first and second output control signals in accordance with the copyright information and a copyright information detection result received by the communications section from the external device.

3 Claims, 2 Drawing Sheets

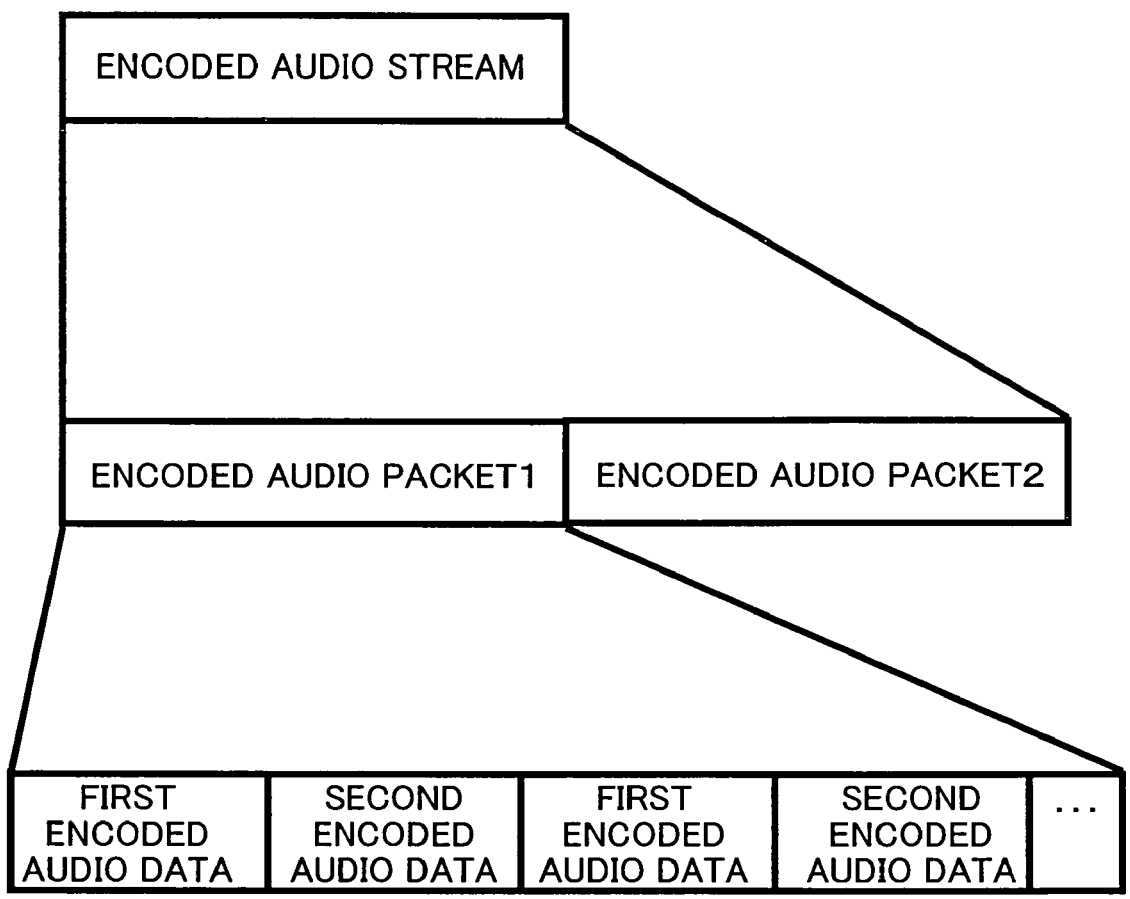

DECODING APPARATUS

BACKGROUND OF THE INVENTION

The present invention relates to a decoding apparatus for decoding encoded video and audio data, and particularly relates to copyright protection technology.

The amount of information in digitized video and audio data is usually reduced by high-efficiency coding process and then the resultant data is multiplexed so as to be recorded on a recording medium or transmitted. The major examples of the recording medium include a DVD (Digital Versatile Disc). The major examples of the transmission include distribution via a digital television broadcast or the Internet.

Video data is encoded mainly according to the MPEG-2 (Moving Picture Experts Group-2) standard, the MPEG-4 standard, or the like, while audio data is encoded mainly in accordance with Dolby Digital, DTS (Digital Theater Systems), MPEG Audio, PCM (Pulse Code Modulation), or the like.

Audio data encoded according to these encoding methods will be hereinafter referred to as "encoded audio data". In many cases, multiple channels of audio data are encoded as encoded audio data.

If video and audio are converted into digital data, they can be recorded or transmitted more conveniently, while replication thereof without degradation becomes possible, leading to the problem of copyright infringement. In order to deal with this problem, a technique for embedding copyright information in video and audio data has been developed. Although detailed explanation of this technique will be omitted herein, this kind of technique has already been employed in DVD-Audio and the like, for example.

To detect copyright information, it is required to decode video and audio data and to perform detection process. Another method is to manage copyright information by carrying out communications with a network and the like. For example, Japanese Laid-Open Publication No. 2002-359835 discloses an example of a technique in which a database for authentication is used.

Also, an external device, such as an AV (audiovisual) amplifier, can be connected to systems for playing back CDs (Compact Discs) and DVDs. For instance, audio data encoded by an encoding method, which cannot be played back by a DVD player, can be played back by an AV amplifier connected to the player.

However, it requires a complicated procedure to perform authentication with respect to packaged media, such as CDs and DVDs, by way of a network. In addition, systems with network function can only play back such data.

Furthermore, when data is played back by a connected external device, a problem arises in that the DVD player cannot check copyright information in encoded audio data output to the external device.

SUMMARY OF THE INVENTION

It is an object of the present invention to provide copyright protection even when encoded audio data is decoded by an external device.

According to the present invention, when encoded audio data that a decoding apparatus cannot decode is decoded by an external device, the decoding apparatus controls the output of the data according to a copyright information detection result obtained by the external device.

More specifically, an inventive decoding apparatus includes: a decoding section for decoding a first one of input encoded audio data sets that has been encoded by a certain encoding method; a first output section for outputting audio data decoded by the decoding section, in accordance with a first output control signal; a second output section for externally outputting the first one of the input encoded audio data sets, or a second one of the input encoded audio data sets, in accordance with a second output control signal, the second one of the input encoded audio data sets being encoded by an encoding method different from the certain encoding method; a copyright information detection section for detecting copyright information from the audio data decoded by the decoding section and outputting the copyright information; a communications section for communicating with an external device which receives the encoded audio data set output from the second output section; and an output control section for outputting the first and second output control signals in accordance with the copyright information and a copyright information detection result received by the communications section from the external device.

In the inventive decoding apparatus, even when the encoded audio data is decoded by the external device, the outputs of the first and second output sections can be controlled in accordance with the copyright information, whereby the copyright can be protected.

According to the present invention, the copyright information detection result is received from the external device. Therefore, even when the encoded audio data is decoded by the external device, it is possible to protect the copyright to the contents.

BRIEF DESCRIPTION OF THE DRAWINGS

FIG. 2 is an explanatory view illustrating an exemplary configuration of an encoded audio stream that is input into the decoding apparatus of FIG. 1.

DETAILED DESCRIPTION OF THE INVENTION

Figure 1:
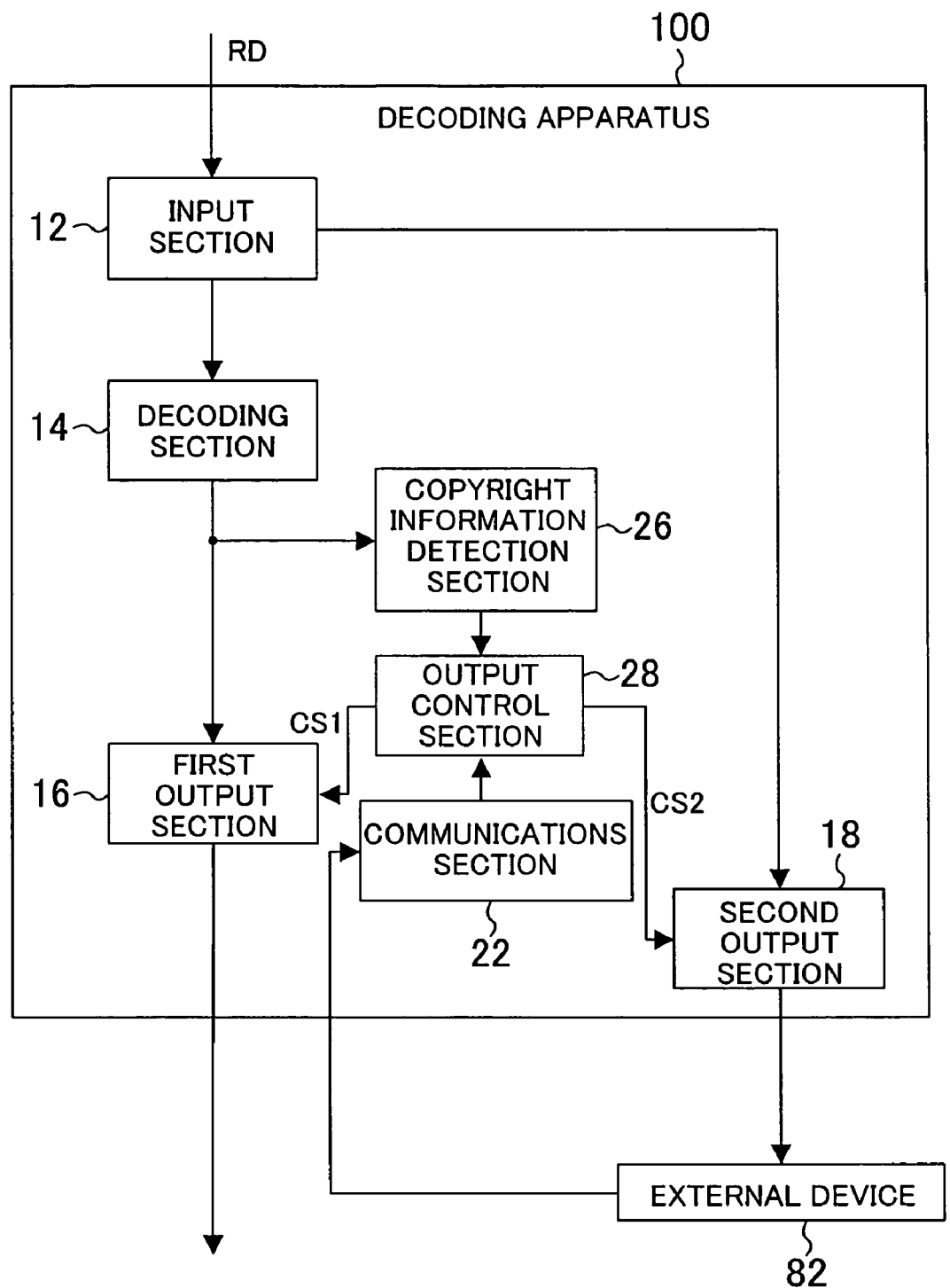
FIG. 1 is a block diagram of a decoding apparatus according to an embodiment of the present invention.

Hereinafter, embodiments of the present invention will be described with reference to the accompanying drawings.

FIG. 1 is a block diagram of a decoding apparatus according to an embodiment of the present invention. The decoding apparatus 100 of FIG. 1 includes an input section 12, a decoding section 14, a first output section 16, a second output section 18, a communications section 22, a copyright information detection section 26, and an output control section 28. The decoding apparatus 100 of FIG. 1 is used in a DVD player with audio watermark detection capability, for example.

Data RD of contents read from a DVD, for example, is input as a stream into the input section 12. In the data RD, encoded video data and encoded audio data have been multiplexed together. In the encoded audio data in the data RD, copyright information is embedded as a watermark. The input section 12 divides the input data RD into the encoded video data and the encoded audio data and outputs the encoded video and audio data to the decoding section 14, while outputting the encoded audio data to the second output section 18.

The decoding section 14 decodes the encoded video and audio data according to the MPEG-2 standard or the like to output the obtained decoded video and audio data to the first output section 16 and to the copyright information detection section 26. The first output section 16 outputs the decoded video and audio data in accordance with an output control signal CS1 output from the output control section 28.

The copyright information detection section 26 detects the copyright information embedded in the decoded audio data to output the detected copyright information to the output control section 28.

The second output section 18 outputs the encoded audio data to an external device 82 in accordance with an output control signal CS2 output from the output control section 28. The second output section 18 may output the encoded audio data that is to be decoded by the decoding section 14, i.e., the encoded audio data encoded by the same encoding method as the audio data output from the first output section 16, or may output encoded audio data encoded by a different method. The external device 82 decodes the encoded audio data output from the second output section 18 and then detects the copyright information so as to output the detection result to the communications section 22. The communications section 22 outputs the copyright information detection result received from the external device 82 to the output control section 28.

The output control section 28 outputs the output control signals CS1 and CS2 for controlling the output processing of the respective first and second output sections 16 and 18, in accordance with the outputs of the copyright information detection section 26 and communications section 22. Particularly when the output control section 28 determines, according to the detected copyright information, that the contents being played back are unauthorized contents, the output control section 28 outputs the first and second output control signals CS1 and CS2 so as to stop the outputs of the first and second output sections 16 and 18.

When the copyright information detection result output from the external device 82 indicates that the encoded audio data output from the second output section 18 is unauthorized data, the output control section 28 also outputs the first and second output control signals CS1 and CS2 so as to stop the outputs of the first and second output sections 16 and 18.

FIG. 2 is an explanatory view illustrating an exemplary configuration of the encoded audio stream that is input into the decoding apparatus of FIG. 1. As shown in FIG. 2, the single encoded audio stream input into the input section 12 contains a plurality of encoded audio packets. Each encoded audio packet contains multiple types of encoded audio data encoded by different encoding methods. Explanation of the encoded video data will be omitted herein.

Each encoded audio packet contains first encoded audio data and second encoded audio data that are arranged alternately, for example. It is assumed herein as an example that the first encoded audio data is data (Dolby Digital data) encoded according to Dolby Digital and the second encoded audio data is data (DTS data) encoded according to DTS. Each encoded audio packet may further contain third encoded audio data.

For example, assume a case in which the first output section 16 outputs audio data obtained by decoding the Dolby Digital data and the second output section 18 outputs the DTS data. In this case, the DTS data is output without performing a detection process for detecting copyright information in the DTS data.

When the copyright information has not been detected from the result obtained by decoding the Dolby Digital data due to an error or the like, it is necessary to detect the copyright information from the DTS data. In such a case, the external device 82 decodes the DTS data output from the second output section 18, detects the copyright information, and outputs the detected copyright information to the communications section 22. Therefore, the output control section 28 can control the outputs of the first and second output sections 16 and 18 based on the copyright information detected from the DTS data.

As described above, in the decoding apparatus of FIG. 1, even in the case where the copyright information cannot be detected from the first encoded audio data, the copyright information can be detected from the second encoded audio data that is output to the external device, which provides a higher level of copyright protection.

Also, the communications section 22 identifies whether or not the external device 82 has copyright information detection capability and outputs the result to the output control section 28. When informed that the external device 82 does not have copyright information detection capability, the output control section 28 stops the output of the second output section 18, whereby the output of data to the external device that cannot provide copyright protection is stopped.

Although the second output section 18 and the communications section 22 are provided in the foregoing description, these sections may be realized as one block.

Also, communications between the second output section 18 and the external device 82 and between the external device 82 and the communications section 22 may be performed over a single communications line. For example, HDMI (High-Definition Multimedia Interface) may be used.

Furthermore, although data read from a DVD is processed in the above-described exemplary case, the present invention is not limited to this, but data stored on other recording media, such as other optical disks and hard disks, data read from semiconductor memory, broadcast data, data received over a network, and the like may also be processed.

The above-described processing may be realized not only by hardware but also by software by using a processor. Alternatively, part of the processing may be performed by hardware and the rest may be performed by software.

As described above, even in cases where encoded audio data is decoded by an external device, the present invention is capable of protecting the copyright to the contents and is thus effectively applicable to DVD players and the like and, in addition, to other optical disk players, hard disk drive players, semiconductor players, network players, and the like.

What is claimed is:

1. A decoding apparatus, comprising:
   a processor;
   a decoding section for decoding a first set of input encoded audio data that has been encoded by a certain encoding method;
   a first output section for outputting audio data decoded by the decoding section, in accordance with a first output control signal;
   a second output section for externally outputting the first set of the input encoded audio data, or a second set of the input encoded audio data being encoded by an encoding method different from the certain encoding method;
   a copyright information detection section for detecting copyright information from the audio data decoded by the decoding section and outputting the copyright information;
   a communications section for communicating with an external device which receives the encoded audio data output from the second output section; and
   an output control section for outputting the first and second output control signals in accordance with the copyright information and a copyright information detection result received by the communications section from the external device, wherein the first output section outputs the audio data decoded by the decoding section, and the second output section outputs the encoded audio data, in a parallel manner.

2. The decoding apparatus of claim 1, wherein if the copyright information detection result indicates that the encoded audio data output from the second output section is unauthorized data, the output control section outputs the first and second output control signals so as to stop the outputs of the first and second output sections.

3. The decoding apparatus of claim 1, wherein when the communications section has identified that the external device does not have copyright information detection capability, the communications section makes the output control section output the second output control signal so as to prevent the second output section from outputting the encoded audio data.

* * * * *